(12) United States Patent
Kuwayama (10) Patent No.: US 6,674,694 B1
(45) Date of Patent: Jan. 6, 2004

(54) LIGHT-PICKUP DEVICE APPLIED TO A RECORDING AND/OR REPRODUCTION DEVICE FOR AN OPTICAL DISK INLUDING A DETECTION CIRCUIT THAT GENERATES A FOCUS ZERO CROSS SIGNAL

(75) Inventor: Yasunori Kuwayama, Ikoma (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/501,834

(22) Filed: Feb. 10, 2000

(30) Foreign Application Priority Data

Feb. 18, 1999 (JP) .................................. 11-040704

(51) Int. Cl.[7] ................................................ G11B 7/09
(52) U.S. Cl. ........................ 369/44.29; 369/44.25; 369/53.28
(58) Field of Search ............... 369/44.25, 44.27, 369/44.29, 53.28

(56) References Cited

U.S. PATENT DOCUMENTS

| 4,755,980 | A | * | 7/1988 | Yoshimaru et al. | ............ | 369/54 |
| 5,459,309 | A | * | 10/1995 | Kagami et al. | ............ | 250/201.5 |
| 5,978,328 | A | * | 11/1999 | Tanaka | ............ | 369/44.27 |
| 5,999,503 | A | * | 12/1999 | Tateishi et al. | ............ | 369/44.29 |
| 6,091,680 | A | * | 7/2000 | Matsuda et al. | ............ | 369/44.29 |
| 6,101,156 | A | * | 8/2000 | Tanaka et al. | ............ | 369/44.28 |
| 6,327,234 | B1 | * | 12/2001 | Kamiyama et al. | ............ | 369/53.23 |
| 6,370,093 | B1 | * | 4/2002 | Tada et al. | ............ | 369/44.25 |

FOREIGN PATENT DOCUMENTS

| JP | 61-080626 | 4/1986 |
| JP | 6-150334 | 5/1994 |
| JP | 6-243497 | 9/1994 |
| JP | 9-50630 | 2/1997 |
| JP | 09-270136 | 10/1997 |
| JP | 09-326161 | 12/1997 |
| JP | 11-345421 | 12/1999 |

* cited by examiner

Primary Examiner—Gautam R. Patel
(74) Attorney, Agent, or Firm—Jordan and Hamburg LLP

(57) ABSTRACT

A light-pickup device has a constitution in which a microcomputer executes control for applying offset voltage to a focus error signal by changing over connection of an FE offset circuit when a servo-processor kicks focus drive voltage for acceleration in order to change over information recording layers of an optical disk having two information recording layers on a plane thereof. Then, a signal output level at a zone in which no focus error signal is occurred, does not coincide with focus zero cross. Owing to this constitution, the servo-processor detects focus zero cross point of the focus error signal even in a simple circuit structure.

5 Claims, 6 Drawing Sheets

LIGHT-PICKUP DEVICE APPLIED TO A RECORDING AND/OR REPRODUCTION DEVICE FOR AN OPTICAL DISK INLUDING A DETECTION CIRCUIT THAT GENERATES A FOCUS ZERO CROSS SIGNAL

This application is based on Patent Application No. 11-040704 filed in Japan, the contents of which are hereby incorporated by reference.

BACKGROUND OF THE INVENTION

This invention relates generally to a light-pickup device applied to an optical disk device for recording, reproducing, and erasing information in an optical disk having plural data recording layers. Particularly, the invention relates to detection of timing for a changeover between acceleration and deceleration of focus drive voltage when the light-pickup device changes between information recording layers.

Figure 1:
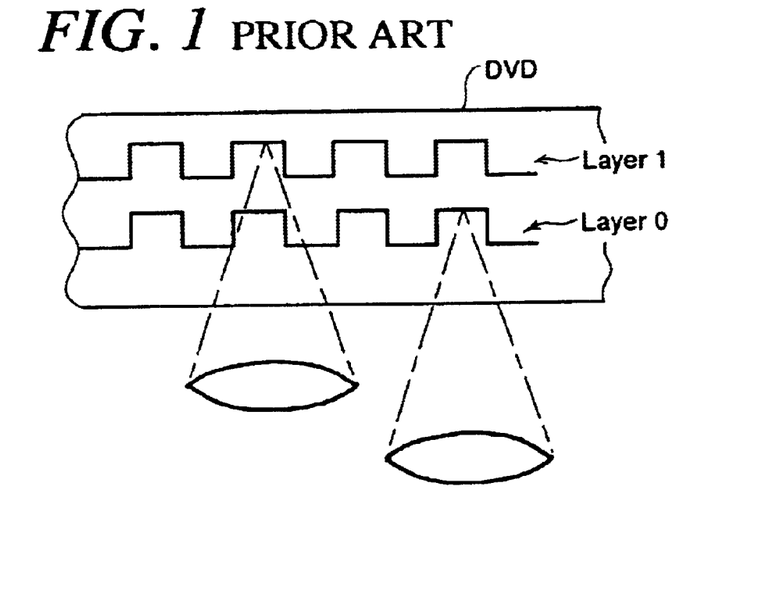
FIG. 1 is a view of performing focus servo to each of layers of an optical disk having multiple information recording layers.

Conventionally, an optical disk device which records, reproduces or erases information in an optical disk laving multiple information recording layers, such as a single-side two-layer DVD, needs to read out the information which is recorded in each of Layer 0 and Layer 1 from one side of the optical disk as shown in FIG. 1. Therefore, in order to change from a state in which a light-pickup device is reading out information recorded in Layer 0 into a state in which it reads out information recorded in Layer 1, the optical disk device performs an operation that is known as "focus kick". The focus kick is an operation for accelerating or decelerating focus drive voltage applied to an actuator which drives a tens of the light-pickup device. Controlling timing for carrying out the focus kick enables movement of the lens of the light-pickup device from a position for performing the focus servo in one layer to a position for performing the focus servo in the other layer.

Figure 2:
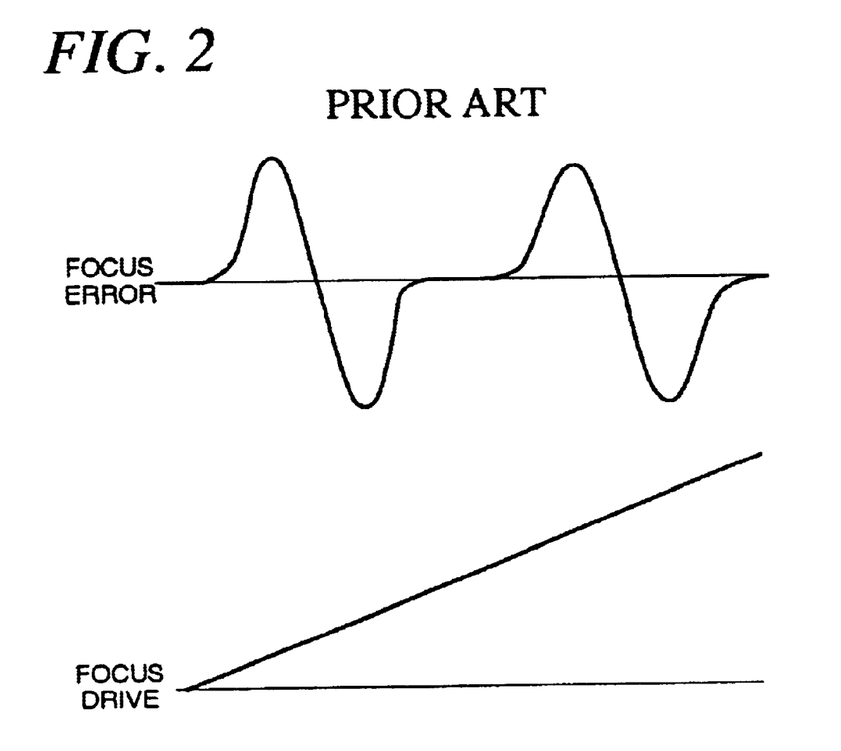
FIG. 2 is a view of a conventional example showing a relationship between a focus error signal and focus drive voltage.
Figure 3:
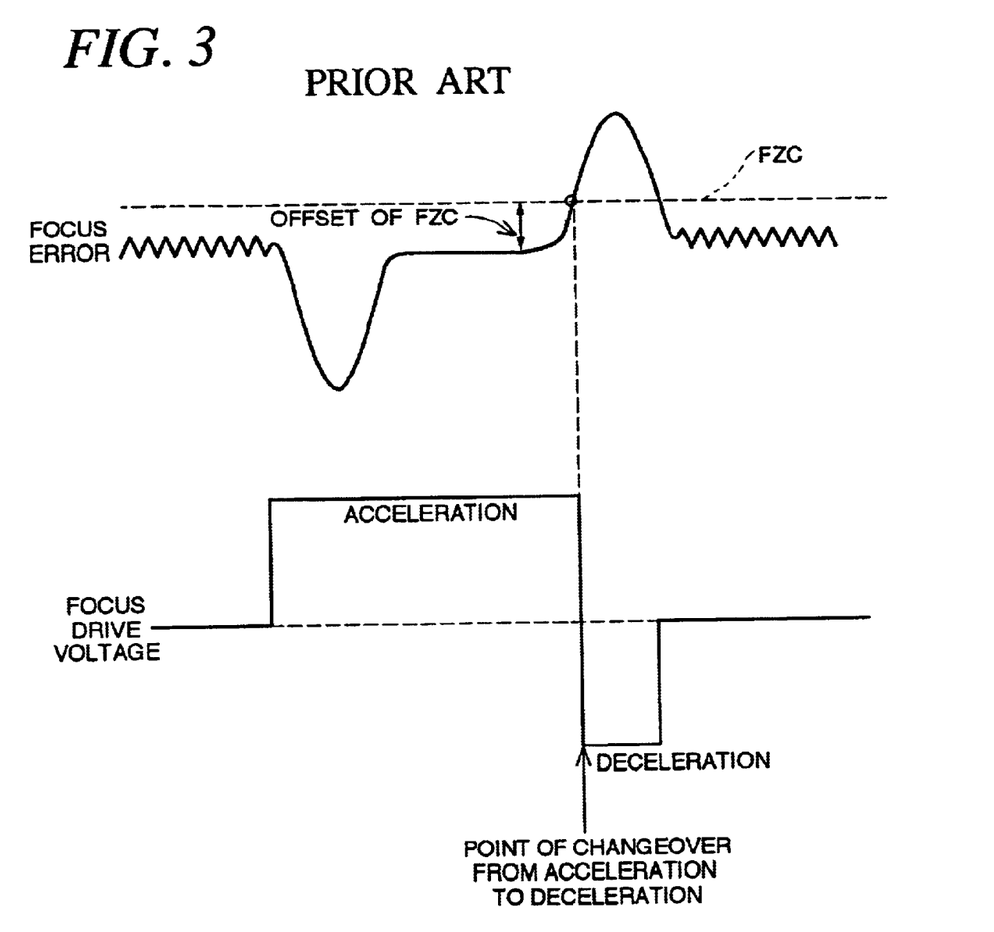
FIG. 3 is a view showing a focus error signal in case that offset voltage is applied to focus zero cross (FZC) in a conventional manner, and timing for changeover between acceleration and deceleration of the focus drive voltage in the above manner.
Figure 4:
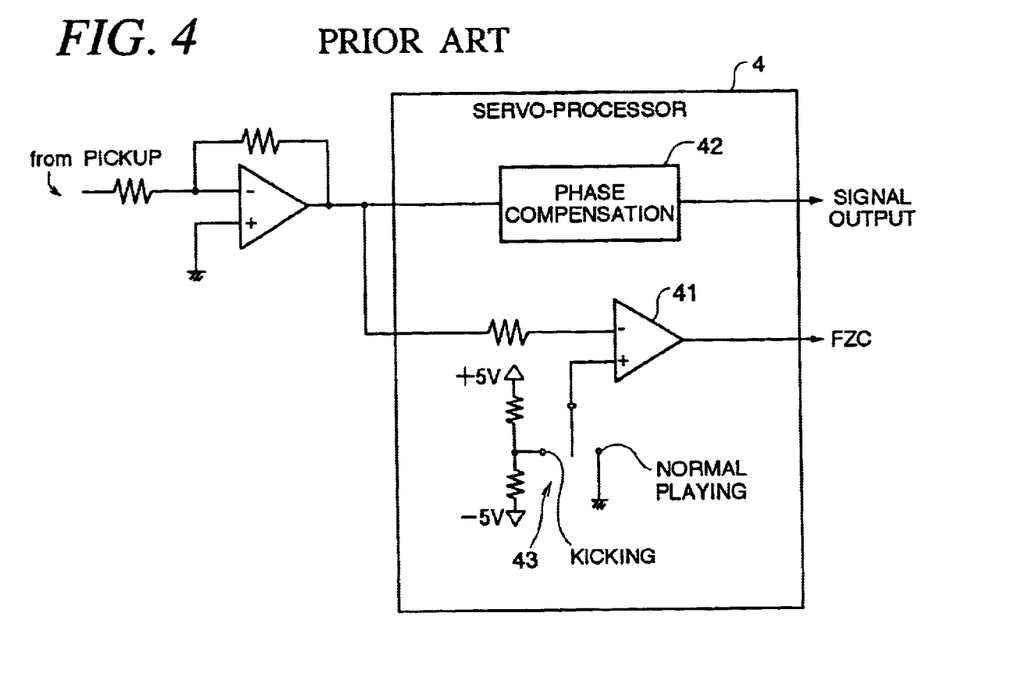
FIG. 4 is a view of a conventional constitution for applying the offset voltage to the focus zero cross.

That is, the acceleration kick of the focus drive voltage is performed in the state that the focus servo is carried out for Layer 0, and then the deceleration kick of the focus drive voltage is performed, which makes it possible to change over into a state for performing the focus servo for Layer 1 from for Layer 0. In this case, the timing for the deceleration kick of the focus drive voltage has to be specified. Generally, a point (referred to as focus zero cross point) where output value from a focus error signal crosses a focus zero cross value (predetermined reference value) is employed for the timing. However, as shown in FIG. 2, in an optical disk having multiple information recording layers, when the focus drive voltage is gradually increased, an output value of the focus error signal forms a curve having two S-shapes in response to a change in a distance between a lens and an image recording layer of the disk with the lens movement. This makes a zone in which no focus error signal is occurred at midpoint of a changeover of focusing from one layer to the other, so that the focus zero cross point cannot be detected in this zone, which makes it unable to specify a point of kicking the drive voltage for deceleration. Therefore, as shown in FIG. 4, the light-pickup device has a constitution in which a switch mechanism 43 is provided for applying an offset to the focus zero cross point detection circuit 41 in the servo-processor (IC (integrated circuit)) 4, thereby applying the offset voltage at a reference value level of a comparator for detecting the focus zero cross. Owing to said constitution, as shown in FIG. 3, the focus zero cross (FZC) point can be detected in a state so as to make no coincidence between the zone in which no focus error signal is occurred and the focus zero cross. The control for changeover between the acceleration and deceleration of the focus drive voltage is carried out by using the detected focus zero cross point.

However, the above-described conventional light-pickup device requires a servo-processor which enables change of the reference value level of the comparator for detecting the focus zero cross. Also, such a servo-processor needs an external circuit, which complicates the construction of the circuit her, as shown in Japanese Patent Laid-Open publication 9-270136, there has been provided a light-pickup device which has a function for preventing a malfunction caused by a peak point due to spherical aberration of an optical component in an S-shaped curve drawn by output value of the focus error signal. However, even this device cannot resolve the above-mentioned problems.

SUMMARY OF THE INVENTION

This invention is made to solve the above-mentioned problems. One object of the present invention is to provide a light-pickup device which is capable of detecting a focus zero cross point of a focus error signal with a simple circuit configuration even if the device still employs a servo-processor which is unable to change a reference value level of the comparator for detecting the focus zero cross.

In order to achieve the above-mentioned object, according to one aspect of the present invention, a light-pickup device for an optical disk device which performs recording, reproduction or erasing of information of an optical disk having, plural information recording layers comprises: a light source; a lens for gathering light flux generated by said light source onto an image recording plane; a lens driver for driving said lens; a focus drive voltage controller for controlling focus drive voltage applied to said lens driver, which kicks focus drive voltage for acceleration when the information recording layer is changed over, and kicks the focus drive voltage for deceleration when a focus zero cross is detected from a focus error signal detected based on reflected light flux from the information recording plane; and, an offset voltage controller which applies offset voltage to the focus error signal when the focus drive voltage controller is activated for changing over the information recording layer.

In the above-described constitution, the offset voltage controller applies the offset voltage to the focus error signal, thereby, the focus zero cross point can be detected in a state so as to make no coincidence between the zone in which no focus error signal is occurred and the focus zero cross. The control for changeover between acceleration and deceleration of the focus drive voltage is carried out by using the detected focus zero cross point. Also, the focus zero cross point can be detected only by placing a simple structure for applying the offset voltage to an amplifier of the focus error signal without giving any changes to an IC (integrated circuit) such as a servo-processor comprised in the focus drive voltage controller of said light-pickup device.

According to another aspect of the present invention, the offset voltage controller applies offset voltage to the focus error signal when the focus drive voltage controller kicks the focus drive voltage for acceleration, and finishes applying the offset voltage to the focus error signal when the focus drive voltage controller kicks the focus drive voltage for deceleration.

In the above-described constitution, the offset voltage controller applies the offset voltage to the focus error signal only during time required for detecting timing of kicking the focus drive voltage for deceleration, and applies no offset voltage to the focus error signal after a termination of the deceleration kick. Accordingly, an accurate detection can be given whether the focus servo is performed in an information recording layer which is changed over.

According to a further aspect of the present invention, the offset voltage controller comprises: an operational amplifier having one input terminal to which a focus error signal is input, and another input terminal to which offset voltage is applied; a circuit means for changing over said offset voltage in response to a normal playing mode and a mode for changing the information recording layer; and, a controller for executing control for changing over said circuit means.

In the above-described constitution, the controller executes control for changing over connection of the circuit means having one input terminal to which a focus error signal is input, and another input terminal to which offset voltage is applied, thereby executing control for applying the offset voltage to the focus error signal. Accordingly, the offset voltage can be applied to the focus error signal only by adding (also, possible to built in) a simple circuit to an operational amplifier of the focus signal without placing an external circuit in the IC such as a servo-processor.

DETAILED DESCRIPTION OF THE PREFERRED EMBODIMENT OF THE PRESENT INVENTION

Figure 5:
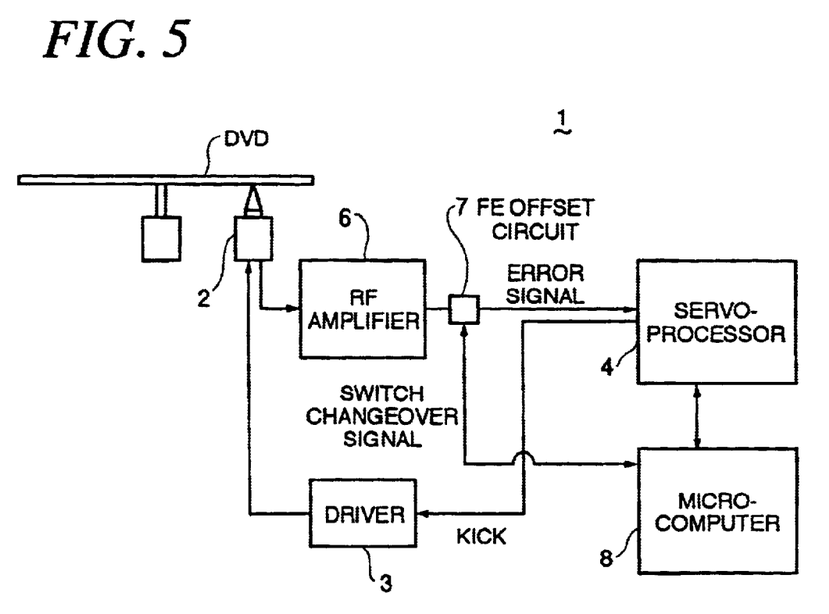
FIG. 5. is a view of a constitution of a light-pickup device according to one embodiment of the present invention.

An embodiment of the present invention is explained with reference to FIGS. 5 through 8. FIG. 5 shows a constitution for carrying out focus drive in a light-pickup device 1 in the present invention. The light-pickup device 1 is applied to an optical disk device which records and reproduces information on an optical disk (single-side two-layer DVD (digital video disk) in the present embodiment) having multiple information recording layers on one side. As shown in the figure, the light-pickup device 1 comprises a light-pickup unit 2 for irradiating light beam to each of data recording layers of the DVD and receiving reflected light, and further comprises as components for performing the focus drive, a driver (lens driver) 3, a servo-processor (focus drive voltage controller) 4, an RF amplifier 6, a microcomputer 8 and the like. The light-pickup unit 2 includes a light source for irradiating light flux to a recording plane of the DVD, a lens for gathering said light flux from the light source onto the data recording plane of the DVD, an actuator (lens driver) for moving the lens to a direction of the layers in the DVD, and a light-receiving unit for receiving the reflected light flux from the recording plane. The servo-processor 4 carries out focus-servo control of the light-pickup unit 2 through the driver 3. The driver 3 controls focus drive voltage applied to the actuator of the light-pickup unit 2. Further, the servo-processor 4 is provided with a phase compensation circuit 42 (refer to FIG. 6) for executing the servo control, and a circuit 41 (refer to FIG. 6) for detecting a focus zero cross point. The focus zero cross is a reference value for finding out that output value of a focus error signal forms an S-shaped curve.

The RF amplifier 6 detects the focus error signal based on the output (reflected light flux from the data recording plane of the DVD) from the light-receiving unit of the light-pickup unit 2, and amplifies it. The focus error signal outputs the value forming an S-shaped curve according to changes of the distance between the lens and the data recording plane of the DVD, and it indicates the distance between the light-gathering point of said light flux and the data-recording plane. The RF amplifier 6 is connected to a focus error offset circuit (circuit means, offset voltage controller) 7 for applying an offset to the focus error signal output from the RF amplifier 6. The output from the focus error offset circuit 7 is inputted into the servo-processor 4. In the servo-processor 4, the detection circuit 41 detects a focus zero-cross point based on the focus error signal, and employs the detected focus zero-cross point as timing for kicking the focus drive voltage for deceleration. The microcomputer 8 (controller, offset voltage controller) controls the entire operation of the light-pickup device 1, and controls for the changing over of the application of the offset voltage to the focus error signal between normal reproduction and in a kick operation by controlling the focus error offset circuit 7 in response to the changeover (kick) between the acceleration and deceleration of the focus drive voltage which is performed by the servo-processor 4.

Figure 6:
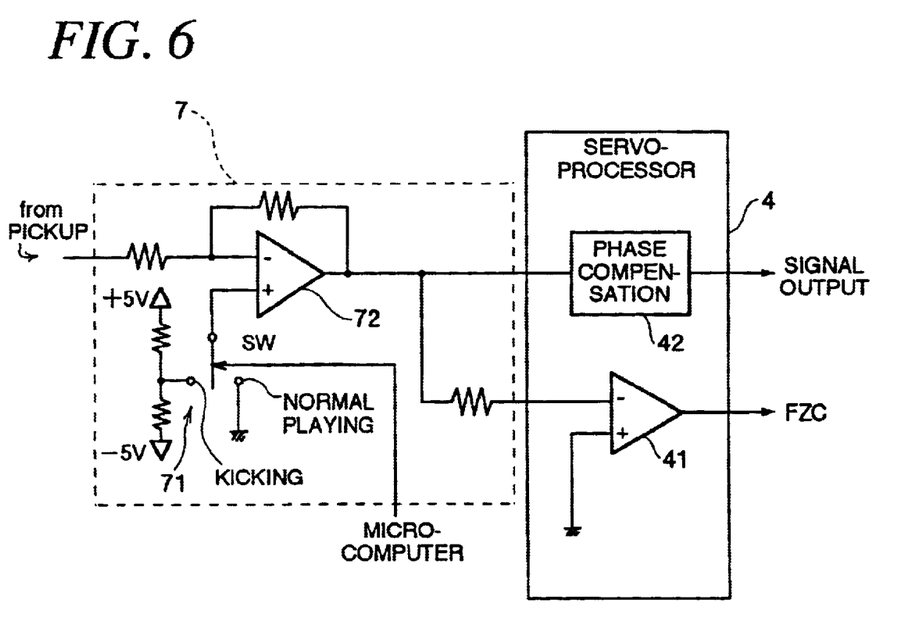
FIG. 6 is a circuit diagram of a focus error offset circuit in said light-pickup device of the present invention.

Referring to FIG. 6, a constitution of the above-mentioned focus error offset circuit 7 (hereinafter referred to as FE offset circuit) is explained. The FE offset circuit 7 includes an operational amplifier 72 having one input terminal (−) into which a focus error signal is input, and another input terminal (+) into which offset voltage is input. The offset voltage is generated by the circuit means 71 which includes a resistance potential-divider circuit and a switch SW, and changes over into either resistance potential dividing point voltage or ground potential. The microcomputer 8 changes the offset voltage generated by the circuit means 71 into the ground potential in the normal reproduction, and changes it into the resistance potential-dividier voltage in the offset voltage application.

Next, a relation between the offset-applied focus error signal and focus zero cross (FZC) is explained. As to a single-side two-layer DVD having two recording layers (hereinafter simply referred to as layer) in the data recording plane, in a case of changing a state of performing focus servo in one layer into a state of performing focus servo in the other, as shown in FIG. 2, there exists a zone in which no focus error signal is output In this zone, a signal output level coincides with the focus zero cross, so that, at a point where a focus error signal is a focus zero cross, this point cannot be specified. Owing to this, in this zone, it is impossible to use the focus zero cross point as the timing for changing focus drive voltage into deceleration kick by the servo-processor.

Figure 7:
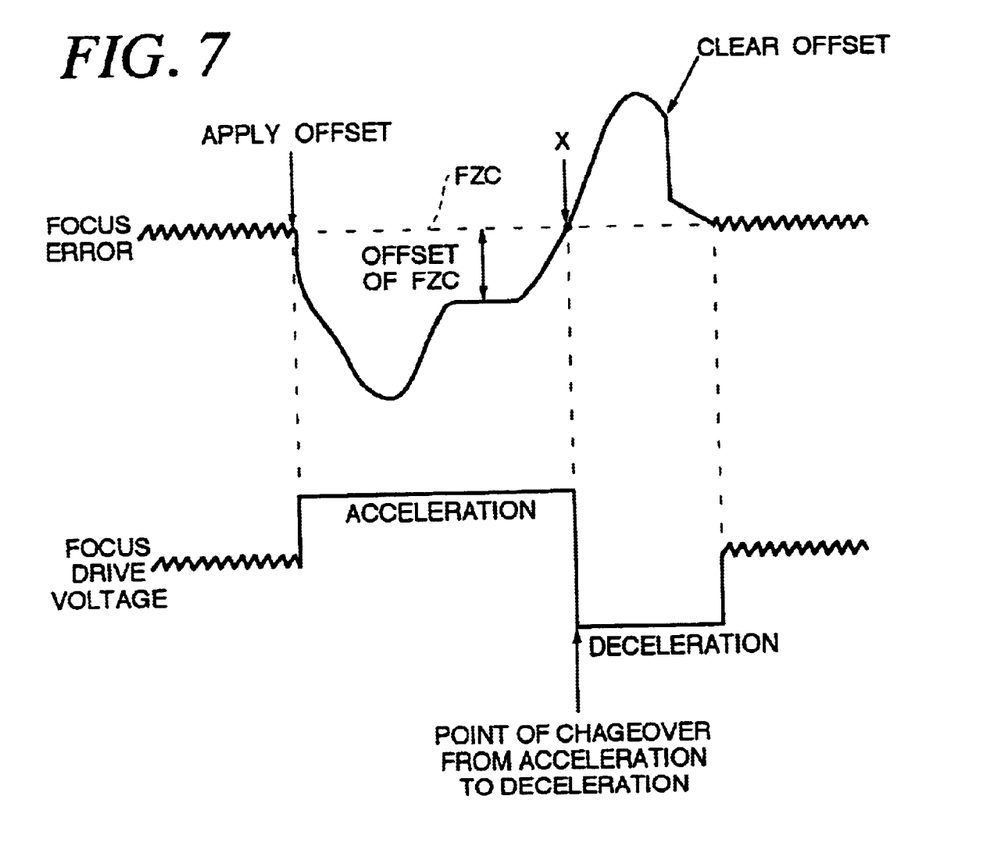
FIG. 7 is a view showing a manner for applying offset voltage to the focus error signal in said device of the present invention, and timing for changeover between acceleration and deceleration of the focus drive voltage.

Whereas, in the present invention, the offset circuit 7 applies the offset voltage to the focus error signal, which deviates the focus error signal from its original level as shown in FIG. 7. Thus, this makes the signal output level at a zone in which no focus error signal is output so as not to coincide with the focus zero cross, thereby allowing the focus zero cross to be specified in only one point X.

In the above-mentioned structure, the focus zero cross point can be used as the timing for changing over the acceleration and deceleration of the focus drive voltage. That is, in order to change a state in which a focus servo is being performed in one layer into a state in which a focus servo is performed in the other, the servo-processor 4 of the present invention starts moving the lens of the light-pickup unit 2 by accelerating the focus drive voltage, and changes over the focus drive voltage into deceleration mode when the focus zero cross point is detected (X). After the predetermined time has elapsed since the detection of the focus zero cross, the focus servo is performed in the other layer by stopping the deceleration of the focus drive voltage. Referring to a flowchart shown in FIG. 8, the explanation is next given to a control for changing a state in which a focus servo is being performed in one layer into a state in which a focus servo is performed in the other. When the servo-processor 4 accelerates the focus drive voltage to be applied to the actuator of the light-pickup unit 2 via the driver 3 in order to move the lens for performing the focus servo in the other layer (acceleration kick: S1), the microcomputer 8 changes over the switch SW of the circuit means 71 in the focus error offset circuit 7 for making connection with the resistance potential-divider, and applies the offset to the focus error signal (S2). Then, when the servo-processor 4 detects the focus zero cross point (X) (YES in S3), the microcomputer 8 starts counting time with a built-in timer (S4), and simultaneously changes over the focus drive voltage to be applied to the actuator into the deceleration kick (deceleration kick: S5).

Figure 8:
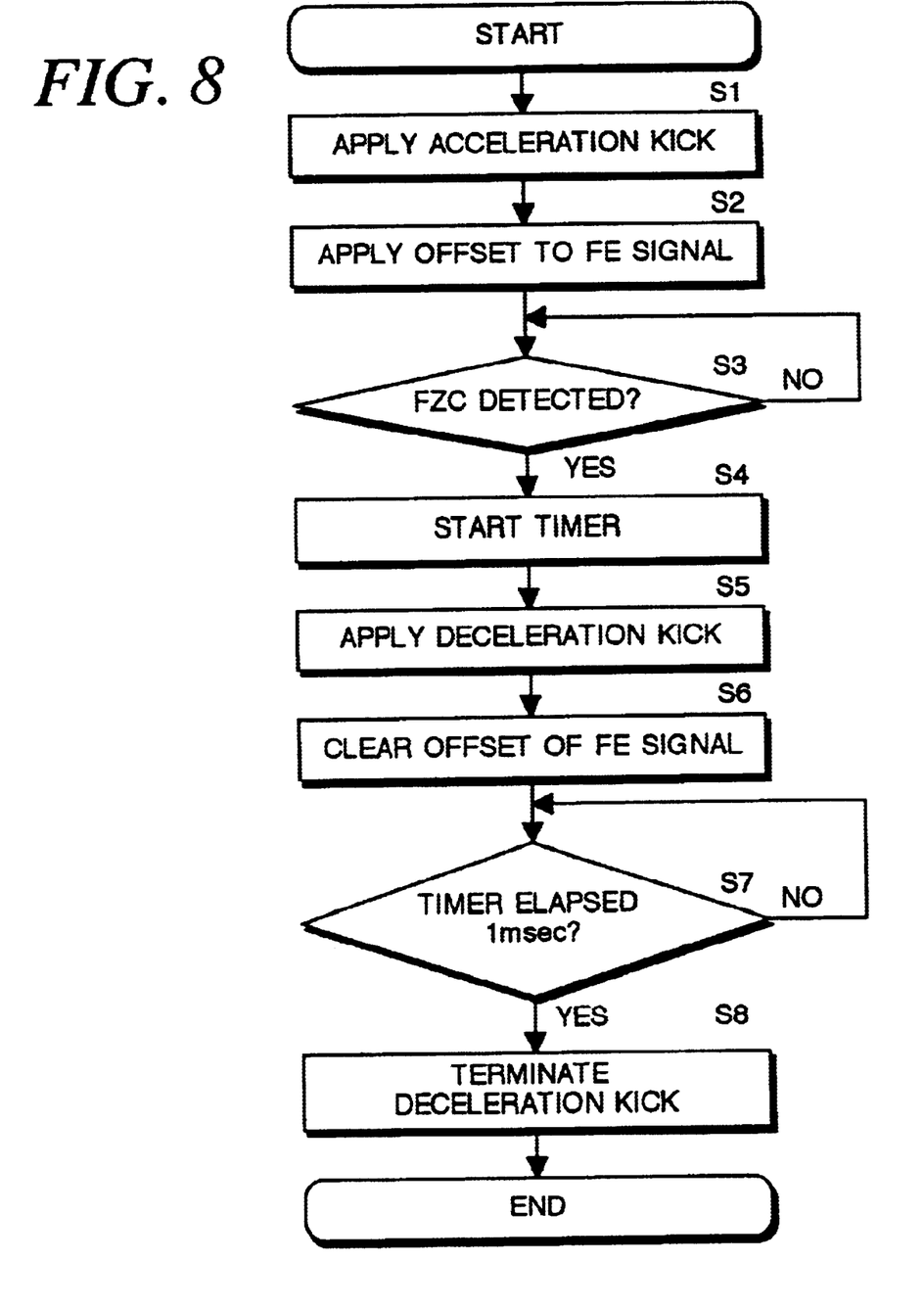
FIG. 8 is a flowchart of a controlling procedure for changing over the focus servo from one layer to the other in said device of the present invention.

After applying the deceleration kick, the microcomputer 8 changes over the switch SW of the focus error offset circuit 7 into the ground position for retrieving the original state from the state that the offset is applied to the focus error signal (S6). The servo-processor 4 has a previously-set time (1 millisecond (msec) in the present embodiment) that is required from the deceleration of the lens movement until the stopping of the lens movement for performing the focus servo. After the built-in timer counts that 1millisecond has elapsed (YES in S7), the servo-processor 4 terminates the deceleration kick to the actuator (S8). In this way, the light-pickup unit 2 changes a state in which the focus servo is being performed in one layer into a state in which the focus servo is performed in the other.

As described above, the light-pickup device of the present invention applies the offset voltage by the focus error offset circuit 7 to the focus error signal which is output from the RF amplifier 6, thereby deviating the focus error signal from its original level, which allows the signal output level at a zone in which no focus error signal is occurred in the lens movement between one layer to the other, not to coincide with the focus zero cross. This makes it possible to detect the focus zero cross point, thereby allowing the focus zero cross point (X) to be used as timing for deceleration kick of the focus drive voltage. Thus, in the present invention, the focus zero cross point can properly be detected without changing the construction of the servo-processor 4. The above-mentioned constitution can provide the timing for deceleration kick of the focus drive voltage only by adding a simple circuit, even with using the servo-processor 4 which cannot make changes to the reference value level of the comparator for detecting the focus zero cross point.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. Although the above embodiment shows a constitution in which a focus error offset circuit 7 is changed over by a switch, the offset voltage can also be changed over in other constitutions. Further, a time between the starting of deceleration kick of the focus drive voltage and the termination of the deceleration kick can be properly varied according to the property of the light-pickup device. Also, in the above embodiment, the present invention is applied for changing information recording layers of a single-side two-layer DVD, but it can widely be applied to an optical disk having multiple information recording layers.

What is claimed is:

1. A light-pickup device for an optical disk device which performs recording, reproduction or erasing of information of an optical disk having plural information recording layers, comprising:

a light source;

a lens for gathering light flux generated by said light source onto an image recording plane;

a lens driver for driving said lens;

a focus drive voltage controller for controlling a focus drive voltage applied to said lens driver, which kicks the focus drive voltage for accleration when the information recording layer is changed over, and kicks the focus drive voltage for deceleration when a focus zero cross is detected from a focus error signal detected based on reflected light flux from the information recording plane;

an offset voltage controller which applies offset voltage to the focus error signal when the focus drive voltage controller is activated for changing over the information recording layer;

a detection circuit which generates a focus zero cross signal by comparing the focus error signal having the offset voltage applied thereto against a reference level; and the offset voltage controller including:
 an operational amplifier having one input terminal to which the focus error signal is input, and another input terminal to which offset voltage is applied;
 a circuit means for changing over said offset voltage in response to a normal reproduction mode and a mode for changing the information recording layer; and,
 a controller for executing control for changing over sad circuit means.

2. A light-pickup device for an optical disk device which performs recording, reproduction or erasing of information of an optical disk having plural information recording layers comprising:

a light source;

a lens for gathering light flux generated by said light source onto an image recording plane;

a lens driver for driving said lens;

a focus drive voltage controller for controlling focus drive voltage applied to said lens driver, which kicks focus drive voltage for acceleration when the information recording layer is changed over, and kicks the focus drive voltage for deceleration when a focus zero cross is detected from a focus error signal detected based on reflected light flux from the information recording plane;

an offset voltage controller which applies offset voltage to the focus error signal when the focus drive voltage controller is activated for changing over the information recording layer;

an operational amplifier having one input terminal to which a focus error signal is input, and another input terminal to which offset voltage is applied;

a circuit means for changing over said offset voltage in response to a normal reproduction mode and a mode for changing the information recording layer; and a controller for executing control for changing over said circuit means.

3. The light-pickup device as claimed in claim 2, wherein the information recording layer is changed over by a changeover from a state in which a focus servo is being performed in one layer into a state in which a focus servo is to be performed in another layer.

4. The light-pickup device as claimed in claim 2, wherein said offset voltage controller applies offset voltage to the focus error signal when the focus drive voltage controller kicks the focus drive voltage for acceleration, and finishes applying the offset voltage to the focus error signal when the focus drive voltage controller kicks the focus drive voltage for deceleration.

5. The light-pickup device as claimed in claim 4, wherein the offset voltage controller terminates the kick of the focus drive voltage for deceleration after a predetermined time has elapsed since the detection of the focus zero cross.

* * * * *